INVENTORS
ROBERT L. BLANCHARD
ARTHUR E. SHERBURNE
BY
*Blair & Buckles*
ATTORNEYS

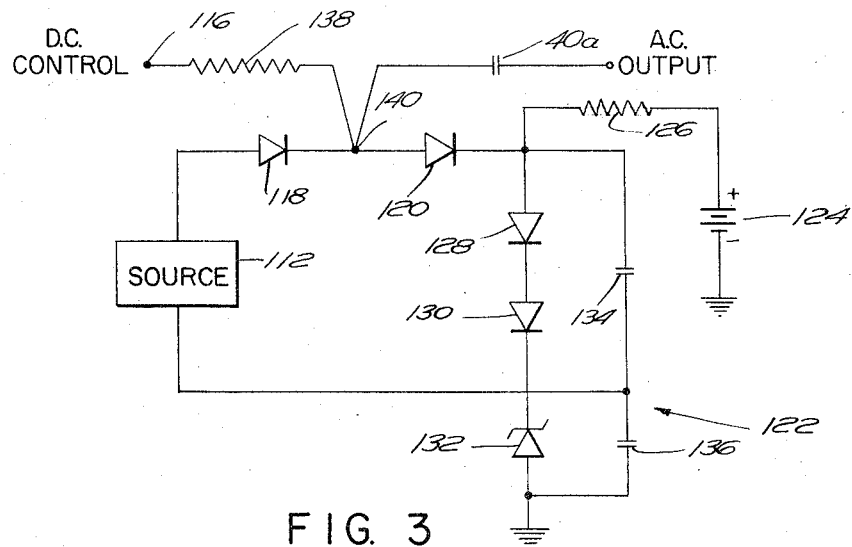
FIG. 3
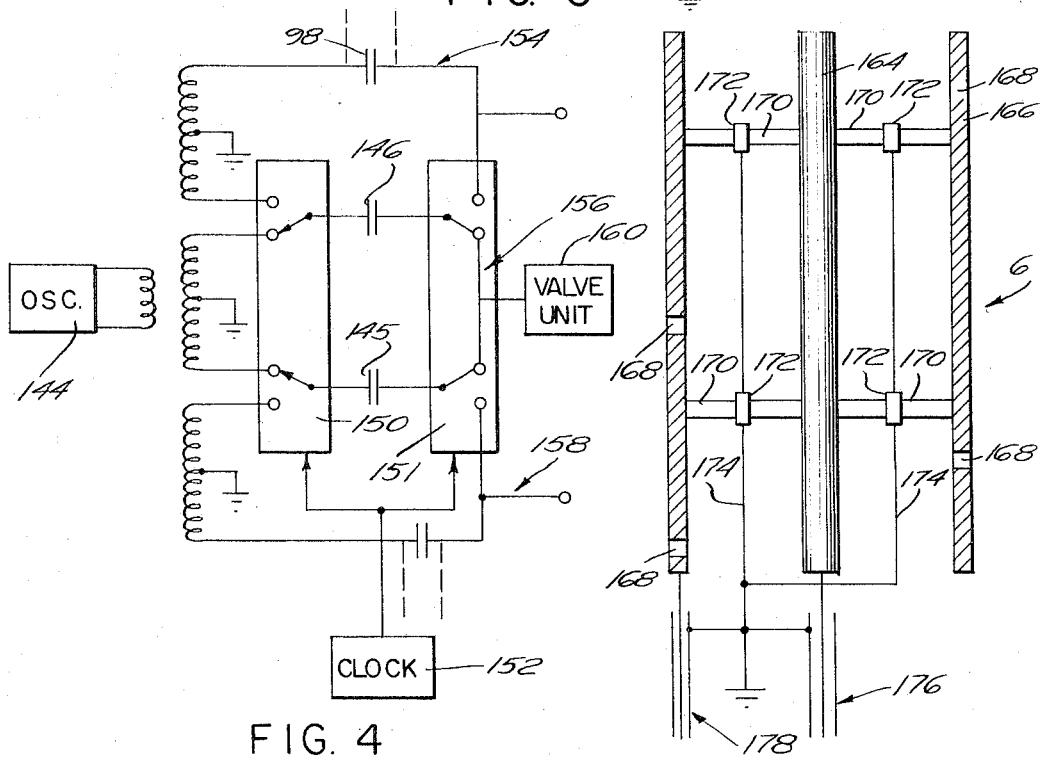
FIG. 4
FIG. 5
INVENTORS
ROBERT L. BLANCHARD
ARTHUR E. SHERBURNE
BY
Blair & Buckles
ATTORNEYS INVENTORS
ROBERT L. BLANCHARD
ARTHUR E. SHERBURNE
BY
*Blair & Buckles*
ATTORNEYS ём
United States Patent Office 3,301,056
Patented Jan. 31, 1967

3,301,056
LIQUID MEASURING SYSTEM
Robert L. Blanchard, Lexington, and Arthur E. Sherburne, Bedford, Mass., assignors to Trans-Sonics, Inc., Lexington, Mass.
Filed June 14, 1963, Ser. No. 287,882
25 Claims. (Cl. 73—304)

The present invention relates to the art of fluid depth measurement. More particularly, it relates to a digital system for measuring the level, volume or mass of a fluid at a remote point. The system utilizes a capacitive sensor wherein the fluid of interest is the dielectric medium between the sensor electrodes. Variation in the fluid condition is reflected in the capacitance of the snsor. The capacitance of the sensor, in turn, is determined by use of digital techniques.

Hitherto, electronic systems designed for the measurement of a fluid condition have, for the most part, used analog techniques and, in particular, analog servo bridge systems. The servo unit in these systems generally operates, in response to a bridge unbalance signal, to alter the capacitance of a variable capacitor in one arm of the bridge and thus balance the variations in a second capacitor in another arm which varies with the depth of the monitored fluid. Systems of this nature suffer from many disadvantages and limitations because of the use of moving parts, which are acceleration sensitive. This constitutes a severe limitation in mobile applications.

In the field of airborne instrumentation, condition-responsive systems must meet rigorous specifications. A basic requirement is light weight and compactness, characteristics not readily achieved in analog systems. In addition, the system must be reliable because of the hazardous aspects of flight. A system of moving parts is often inherently less reliable than one without, particularly when subjected to extreme environmental conditions.

A further disadvantage of analog systems resides in the fact that the operating speed is not constant, i.e., while there is a rapid response to a large bridge unbalance, there is a slow response to a small unbalance. Damping is oftentimes required to surpress the tendency of the system to excessively overshoot the balance condition and this slows the response of the system.

Moreover, with an analog servo bridge, digital data processing of the output signals cannot be achieved without the interposition of additional equipment, viz., an analog-to-digital converter.

It is, therefore, an object of the present invention to provide a fluid monitoring system which monitors such conditions as depth, volume and mass, and is adapted to mobile applications, particularly those involving large accelerations.

It is a further object to provide a system of the above type having no moving parts and capable of rapid response to small changes in the monitored conditions. A related object is to provide a system of rugged construction using solid state active elements.

Another object is to provide a capacitance type of fluid monitoring system which is compact and light-weight, is characterized by high reliability and accuracy, and provides a digital output signal.

Other objects of the invention will in part be obvious and will in part appear hereinafter.

The invention accordingly comprises the features of construction, combinations of elements, and arrangements of parts which will be exemplified in the construction hereinafter set forth and the scope of the invention will be indicated in the claims.

For a fuller understanding of the nature and objects of the invention, reference should be had to the following detailed description taken in connection with the accompanying drawings, in which:

FIG. 1 is a circuit diagram of the invention as used in the determination of liquid level or volume, FIG. 2 is a circuit diagram showing in detail the bridge circuit employed to determine the mass of a liquid, FIG. 3 is a detailed circuit diagram of one of the diode switches which may be used in the system illustrated in FIG. 1, FIG. 4 is a block diagram showing the manner in which two capacitive sensors may be time-shared by separate monitoring networks and a network capable of performing a control function based on the relative capacitances of the sensors, FIG. 5 is a sectional view of a sensing capacitor which may be used in the systems of FIGS. 1 and 2, and FIGS. 6A and 6B schematically illustrate another embodiment of the level or volume measuring system.

In general, our invention operates to determine liquid level or volume by measuring the ratio of two capacitors in different arms of a digital servo bridge circuit. One of these capacitors, used as a reference, is completely submerged in the liquid of interest while the other, being the sensor, extends in the direction in which the liquid level changes. The liquid is the dielectric medium for the reference capacitor, and also for the submerged portion of the sensing capacitor, i.e., the portion below the surface of the liquid. The remaining portion of the sensing capacitor is the atmosphere above the surface of the liquid. Thus, as the liquid level changes, the lengths of the sensing subjected to the liquid and gaseous dielectrics vary inversely with respect to each other, thereby resulting in a change in the over-all capacitance of this capacitor.

The bridge incorporating the reference and sensing capacitors is balanced prior to the immersion of the capacitors in the liquid to be monitored. Immersion unbalances the bridge, and the resulting unbalance or error signal is fed to a detector. The sole purpose of the detector is to sense the polarity of the error signal and thereby determine the direction of unbalance. The output of the detector is a command signal enabling a reversible counter to count clock pulses either "up" or "down," depending upon the polarity of this signal.

Assuming that the counter is originally set to zero, the detector output or command signal will cause it to count up. With the first clock pulse the counter provides a digit output signal, (viz., the number 1). This latter signal is applied to a switching network, which operates to insert a digitally weighted capacitor into the bridge circuit, the inserted capacitance corresponding to the least significant place on the final digital representation of the bridge balance condition.

As a result of this first insertion, the bridge error signal is decreased in amplitude. The detector again senses the phase of the error signal and conditions the counter to count a second clock pulse. The digital output signal from the counter again causes the switching network to insert a second capacitance into the bridge circuit.

This operation continues in cyclic fashion and the counter provides a series of digital output signals which increase in numerically ordered fashion. Each one of these digital signals from the counter causes the switching network to insert a different combination of digitally weighted capacitors, until finally the error signal is reduced essentially to zero.

In practice, the counter will count a succession of clock pulses until the value of the capacitance inserted in the bridge circuit exceeds the amount required for balance. Then the detector, sensing the polarity reversal of the error signal, resulting from the overbalance of the bridge, causes the counter to count down one pulse. The capacitance inserted in the bridge circuit is now too low and the counter counts up one count. Thus, the system alternates between two values of capacitance, one digit apart, which bracket the value corresponding to the liquid level.

It will be appreciated that once the system has bracketed the balance condition of the bridge, rapid changes in this balance condition can be readily followed since it will not be necessary to again start from zero and count up to the balance condition.

By modifying the bridge circuit used to determine liquid level or volume, the mass of the liquid may be indirectly determined without regard to the liquid level or changes in density of the monitored liquid.

Owing to the particular fashion in which the digital determination of the balance condition is developed, the sensor may be timed-shared with other networks for the purpose of achieving certain control functions. Specifically, since there is a discrete interval between the clock pulses during which the counter will retain the digital record of the previous error signal from the bridge circuit, the sensor may be switched out of the bridge circuit and into a different network on a time-sharing basis. Prior to the occurrence of the next succeeding clock pulse, the sensor is switched back into the bridge circuit in time to control stepping of the counter.

The sensing capacitor preferred for use in the invention includes a pair of concentric cylinders which function as the electrodes of a capacitor. The length of the cylinders corresponds to the depth of the tank containing the liquids to be measured or, in other words, the range over which the measurement is to be made. The space between the inner and outer electrodes is thus filled with the monitored liquid up to the surface thereof, while the space between the cylinders throughout the remaining length of the capacitor is filled with the atmosphere above the liquid. Since the dielectric constants of the liquid and the atmosphere are different, the capacitance of the capacitor depends on the depth of the liquid and, in particular, it increases with the depth.

DETAILED DESCRIPTION

Figure 1:
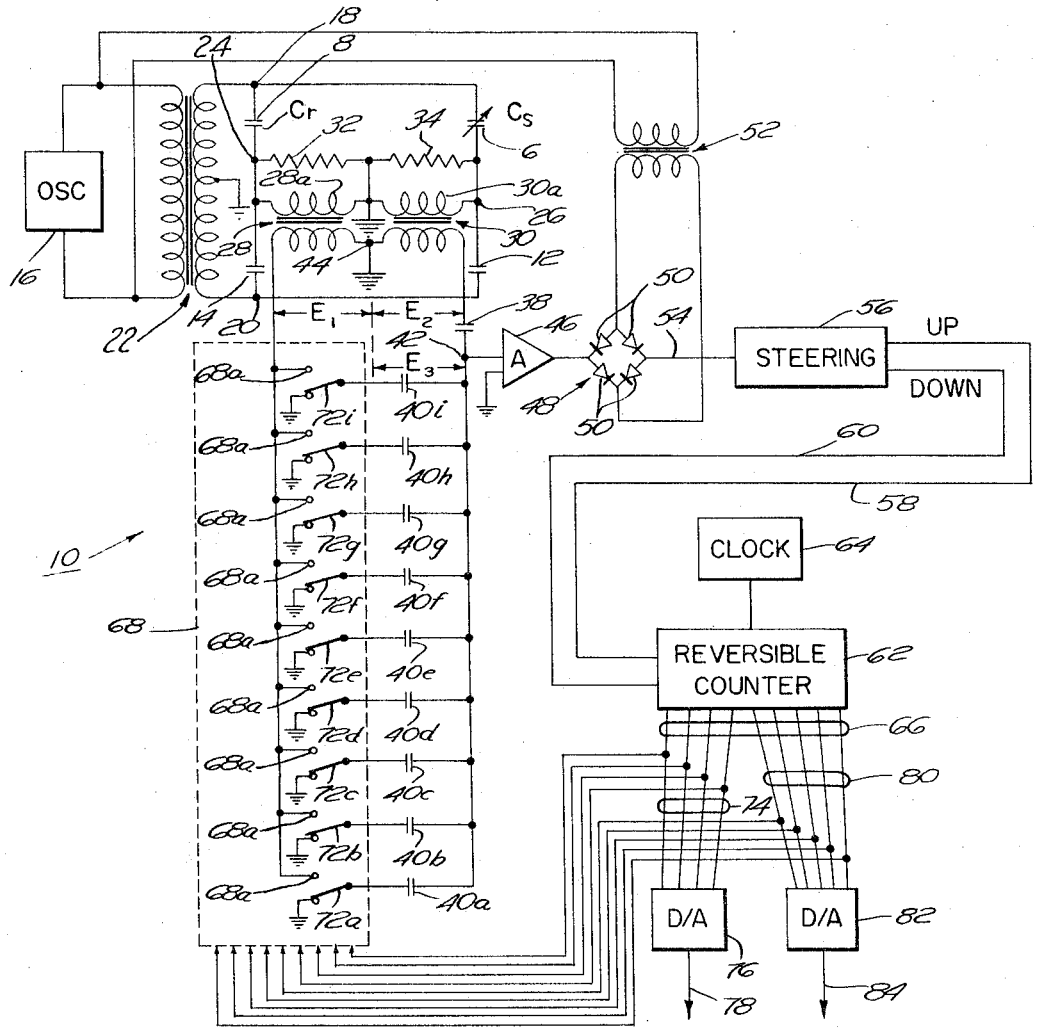

As shown in FIG. 1, a digital servo bridge circuit 10 is connected to determine the relationship between the capacitances $C_s$ and $C_r$ of sensing and reference capacitors 6 and 8, respectively, and thus determine a liquid level in accordance with the derivation set out below.

The four arms of the bridge circuit 10 include the capacitors 6 and 8, together with capacitors 12 and 14. Capacitors 12 and 14 are initially adjusted to balance the bridge 10 before the sensing and reference capacitors 6 and 8 are immersed in the liquid to be monitored. So adjusted, the capacitances $C_{12}$ and $C_{14}$ have the same ratio as $C_s$ and $C_r$.

The bridge circuit 10 is excited by an oscillator 16 having an output signal coupled to points 18 and 20 via a coupling transformer 22. Bridge unbalance resulting from variations in the capacitance $C_s$ appears across the bridge at points 24 and 26. Points 24 and 26 are connected to ground through the primaries of transformers 28 and 30, respectively. Current flow between points 24 and 26 and ground induces voltages $E_1$ and $E_2$ in the secondaries of these transformers. The transformer primaries are individually shunted by resistors 32 and 34 connected from points 24 and 26, respectively, to ground.

The voltage $E_3$ appearing between point 42 and ground is the net bridge unbalance or error signal. The function of the balancing network 36 is to cancel this voltage and thus, in effect, balance out or cancel the unbalance voltage appearing between the points 24 and 26. This error signal ($E_3$) is amplified in an amplifier 46 and fed to a phase detector 48, which includes diodes 50 connected as shown.

To provide a reference for the determination of the phase of $E_3$, the output of oscillator 16 is fed to the detector 48 via a coupling transformer 52. The output of the detector 48, a D.-C. signal appearing on line 54, is fed to a steering gate 56 which provides an output in the form of a command signal on either line 58 or 60, depending upon the polarity of the signal on line 54.

A reversible binary counter 62 is conditioned by the command signals lines 58 and 60 to count clock pulses from a clock 64 in either the forward or the reverse direction, depending upon which of these lines is energized by the steering gate 56. The accumulated count in counter 62 is read out in parallel on lines 66 to energize a switching network 68. The condition of the network 68, as the result of the parallel readout of the counter 62, determines the setting of the digital balancing network 36. Specifically, the counter 62 selectively conditions a plurality of switches 72 to insert appropriate combinations of capacitors 40 into the network 36 corresponding to the digital signals on lines 66.

The level of a liquid having dielectric properties can be measured by a ratio involving two capacitances, in this case, the sensing capacitance $C_s$ and the reference $C_r$. This ratio is independent of the average density or the dielectric constant of the liquid and thus may be used for a variety of liquids and over a wide temperature range.

The operation of the system is described quantitatively by considering an axially uniform sensing capacitor 6 (FIG. 5) filled to a height $h$ with a liquid of dielectric constant $E_1$. The capacitance is given by $$C_s - C_{sv} = C_{sv}\left(\epsilon_1 \frac{h}{H} + \epsilon_g \frac{H-h}{H}\right) \tag{1}$$

or $$C_s - C_{sv} = C_{sv}\left((\epsilon_1 - \epsilon_g)\frac{h}{H} + \epsilon_g - 1\right) \tag{2}$$

where $C_{sv}$ is the vacuum value of $C_s$,
H is the over-all length of sensor,
$\epsilon_1$ is the dielectric constant of the liquid, and
$\epsilon_g$ is the dielectric constant of the gas above liquid level.

Similarly the capacitance of the submerged reference capacitor is $$C_r - C_{rv} = C_{rv}(\epsilon_1 - 1) \tag{3}$$

where $C_{rv}$ is the vacuum value of $C_r$

Equations 2 and 3 may be combined to give the desired height measurements as follows:

$$\frac{h}{H} = \left(\frac{C_s - C_{sv}}{C_r - C_{rv}}\right)\left(\frac{C_{rv}}{C_{sv}}\right)(1 + \alpha_g - \alpha_z) \tag{4}$$

The quantity, $$\frac{C_{rv}}{C_{sv}}$$

is a fixed scale factor and $$\alpha_g \equiv \frac{\epsilon_g - 1}{\epsilon_1 - \epsilon_g}$$

is a gas correction factor which is negligible for most room temperature liquids but may be significant for cryogenic liquids. In the latter case adequate compensation can readily be provided either in the sensor design or by computation.

Thus, the dependent variable in Equation 4, viz., $$\frac{C_s - C_{sv}}{C_r - C_{rv}}$$

is essentially unaffected by changes in the density of the liquid, and is thus substantially independent of temperature over a substantial range thereof. This variable is measured by the digital capacitance bridge of FIG. 1.

First, assume that $R_{32}$ and $R_{34}$, the resistances of resistors 32 and 34 are substantially less than the impedances of the capacitors 6, 8, 12 and 14, and furthermore, that they are substantially less than the impedances reflected across the primaries 28a and 30a of the transformers 28 and 30. The first condition provides that essentially all the voltage between the points 18 and 20 and ground appears across the capacitors 6 and 8, and 12 and 14, respectively.

Then the current I, in the resistor 32 is given by $$I_1 = E_0^\omega (C_R - C_{14}) \quad (5)$$

and the current $I_2$ in the resistor 34 is given by $$I_2 = E_0^\omega (C_s - C_{12}) \quad (6)$$

where $E_0$ is the voltage between the points 18 and 20 and ground.

The voltages $E_1$ and $E_2$ are proportional to $I_1$ and $I_2$, and therefore, $$\frac{E_2}{E_1} = K \frac{C_s - C_{12}}{C_r - C_{14}} \quad (7)$$

where K is a constant of proportionality.

If $C_{12}$ and $C_{14}$ are made equal to $C_{sv}$ and $C_{rv}$, respectively, Equation 7 beocmes $$\frac{E_2}{E_1} = K \frac{C_s - C_{sv}}{C_r - C_{rv}} \quad (8)$$

Moreover, when the network 36 is balanced, i.e., the voltage $E_3$ at the input of the amplifier 46 is zero $$\frac{E_2}{E_1} = \frac{\epsilon C_{40}}{C_{38}} \quad (9)$$

where $C_{38}$ is the capacitance of capacitor 38, and $\epsilon C_{40}$ is the sum of the capacitances 40 connected into the balancing circuit 36, i.e., to the upper swith terminals 68a.

The capacitors 40 preferably have a binary capacitance relationship. Thus, the capacitance of 40a is $C_0$, that of 40b is $2C_0$, that of 40c is $4c_0$ etc., and the sum of these capacitances is given by $$(2^N - 1) c_0$$

where N is the number of capacitors 40. Moreover, assuming a binary counter 62, the switch 72a connected to the capacitor 40a is controlled according to the least significant bit in the counter, the switch 72b is controlled according to the next significant bit, and so on. Specifically, the condition of each bit in the counter may be registered by a flip-flop, whose condition indicates whether the bit is a zero or a one. When the bit is a zero, the switch network 40c grounds the corresponding capacitor 40c. When the bit is a one, the corresponding capacitor is connected to a terminal 68a.

The total capacitance of the capacitors 40 connected to the terminals 68a is the sum of the capacitances correseponding to bits in the counter 62 which have the value one. This sum, $\epsilon C_{40}$, is $nC_0$, where n is the reading of the counter. Substituting these values into (8) and (9), $$\frac{n}{C_{38}/C_0} = K \frac{C_s - C_{sv}}{C_r - C_{rv}} \quad (10)$$

Further substituting in (4), $$\frac{h}{H} = K_1 \frac{n}{C_{38}/C_0} \quad (11)$$

where $K_1$ is a constant.

For the purpose of illustration, assume at the outset that the counter 62 is set at zero and, as a result, all of the capacitors 40 are grounded by the switches 72 and are thus switched out of the balancing network 36. The error signal $E_3$ appearing at point 42 resulting from the imbalance between the voltage ratio $E_2/E_1$ and the capacitance ratio $\epsilon C_{40}/C_{38}$ is amplified by the amplifier 46. The detector 48, which receives inputs from amplifier 46 and oscillator 16, produces either a positive or a negative pulsating D.-C. signal depending on whether the voltage $E_3$ is in phase or 180° out of phase with the signal from oscillator 16. The phase of the voltage $E_3$ with respect to the oscillator 16 depends on whether the capacitance ratio is greater or less than the voltage ratio, i.e., whether $\epsilon C_{40}$ is greater or less than the value corresponding to the liquid depth.

Operation of the detector 48 is readily understood by considering the signal from the transformer 52 as a "keying signal." During one half of each cycle, this signal forward biases the diodes 50 to provide a low impedance path between the amplifier 46 and line 54. The error signal from amplifier 46 is then passed to the line 54 and steering gate 56. During the other half of each cycle of the keying signals, the diodes 50 are reverse biased, and the amplifier 46 is cut off from the gate 56. The polarity of this D.-C. error signal passed to the gate 56 depends upon the relative phase of the A.-C. error signal with respect to that of the keying signal, i.e., whether the positive or the negative half cycle of the error signal occurs during the period the diodes 50 are forward biased.

Assuming that the bridge is underbalanced, i.e., $C_{40}$ is less than the value required for balance of the network 36, the polarity of the signal on line 54 causes the steering gate 56 to energize line 58. This conditions counter 62 to count the next clock pulse from source 64 in the forward direction. Accordingly, upon receipt of the first clock pulse from source 64, the counter energizes one of its output lines 66 connected to the switching network 68.

Specifically, the content of the counter 62 is now 000000001 (assuming a nine-bit counter) and this results in connection of the capacitor 40a into the network 36, so that $$C_{40} = C_0, \text{ and } \frac{n}{C_{38}/C_0} = \frac{1}{C_{38}/C_0}$$

If the bridge 10 and network 36 are still underbalanced, the error signal $E_3$, now somewhat decreased in magnitude, produces a second command signal on line 58 via detector 48 and steering gate 56, thereby conditioning counter 62 to accumulate a second clock pulse from source 64. The content of the counter is now 0000000010. This results in the insertion of the capacitor 40b whose value is $2C_0$ and the simultaneous removal of the capacitor 40a from the balancing network.

This operational cycle continues with the counter accumulating clock pulses and $\epsilon C_{40}$ increasing in increments of $C_0$, until an overbalance condition is achieved, that is, until an incremental increase in $\epsilon C_{40}$ carries this capacitance by the value corresponding to the liquid level. The phase of the error signal $E_3$ then reverses, and the resulting change in the polarity of the output of the detector 48 causes the steering gate 56 to energize command line 60.

Accordingly, the next clock pulse steps the counter 62 one bit in the downward direction. This results in a decrease in $\epsilon C_{40}$ by the increment $C_0$. The bridge is now underbalanced, causing another phase reversal of the error signal $E_3$, and the next clock pulse steps the counter 62 in the forward direction to increase $\epsilon C_{40}$ by $C_0$. The bridge 10 thus reverts to the slightly overbalanced condition.

Thus the system alternates between the digital levels just above and below the value corresponding to the actual liquid level. It will be apparent that the maximum deviation from the actual level is the level increment corresponding to $C_0$, and this is the resolution of the system.

If the liquid level changes, the resulting error signal $E_3$ causes the counter 62 to count pulses in the direction reducing $E_3$. This again brings about a correspondence between the content, n, of the counter and the new liquid level. It will be noted that the system responds rapidly to changes in level, and in fact, it can "track" the level as long as $C_0$, the increment in $\epsilon C_{40}$ during the interval between two successive clock pulses, is at least as great as the increment corresponding to the change in level during this interval. This requirement is readily met with conventional electronic equipment.

The circuit of FIG. 1 can be employed as to ascertain liquid volume, inasmuch as the volume is determined by the liquid level. Where the volume is a non-linear function of level, the capacitor 6 (FIG. 5) may be shaped accordingly, to bring about a linear relationship between volume and the content of the counter 62.

In many applications it is desired to transmit liquid level information to a remote central station. It is often convenient to transmit the data in analog form and thus digital-to-analog conversion is required if the system of FIG. 1 is used. The present invention utilizes a two-step conversion technique to develop coarse scale and fine scale analog signals for transmission.

Thus, as seen in FIG. 1, the four most significant digits of the digital signal are fed in parallel to a digital-to-analog converter 76 over lines 74 and the five least significant digits are fed to digital-to-analog converter 82 over lines 80. Lines 74 and 80 are energized, in the same fashion as lines 62, by the respective stages in the counter 62. The converters 76 and 82 use conventional summing resistance networks to effect the digital-to-analog conversion, with the analog outputs appearing on lines 78 and 84. These analog signals are simply added at the central monitoring station to determine the liquid level.

The fine scale analog signal on line 84 may vary rapidly in magnitude with variations in liquid level and therefore is preferably transmitted continuously. The coarse scale signal on line 78, however, will change slowly in comparison and therefore may be transmitted to the central station over a commutated channel.

Assuming, for example, that each bit making up the signal on lines 74 and 80 represent 0.1 inch of liquid level, the fine scale analog signal, in stepping through 32 discrete voltage levels goes from zero to full scale, or 3.2 inches, before the voltage level of the coarse scale analog signal changes. Over the entire range of measurement, the coarse scale signal will change 16 times and the fine scale analog signal will cycle through its 32 discrete voltage levels a corresponding number of times.

It will be apparent that with the data transmitted in two channels, the resolution required of the analog system is markedly reduced. In fact, with the specific embodiment disclosed herein, the resolution is reduced by a factor of 16, as compared with transmission of the content of the counter 62 over a single analog channel.

The principles of operation described with reference to FIG. 1 can be used to determine liquid mass as well as liquid level or volume. A fundamental molecular property of dielectric liquids provides a stable and accurate means for measuring the quantity of liquid which partially fills a tank. Taking advantage of this property, an elongated sensing capacitor, such as the capacitor 6 of FIG. 5, extends from the bottom to the top of the tank. In a dielectric fluid, the relative dielectric constant is related to the density $\rho$ by $$\frac{\epsilon - 1}{\epsilon + 2} = \delta\rho \qquad (12)$$

and for a limited range of density this reduces to $$\epsilon - 1 = \rho k \qquad (13)$$

where $\delta$ and $k$ are constants.

Thus, for a small element $dx$ along the length of a capacitor such as the capacitor 6, the differential capacitance $d\epsilon$ is related to the density by $$\frac{dC}{dx} = \frac{dC_v}{dx} = k\rho \frac{dC_N}{dh} \qquad (14)$$

Integration of Equation 14 over the length H of the capacitor provides $$C_s - C_{sv} = K \int_0^H \rho \frac{dC_v}{dx} dx \qquad (15)$$

where $C_s$ is the capacitance of the sensing capacitor 6. It is noted that Equation 15 accounts for axial variation of density due, for example, to temperature gradients in this direction. It also accounts for variation of $dC_v/dx$, which is related to the cross-sectional area A of the tank by $$\frac{dC_{sv}}{dx} = k_1 A \qquad (16)$$

in order to calibrate the capacitor in accordance with the shape of the tank.

Thus Equation 15 can be written as $$C_s C_{sv} = kk_1 \left( \int_0^h \rho_l A dh + \int_h^H \rho_g A dh \right) \qquad (17)$$

where the subscripts $l$ and $g$ denote respectively, the liquid and the gas above it. The integrals are the masses of the liquid and gas, and thus Equation 17 reduces to $$c_s - c_{sv} = kk_1(M_l + M_g) \qquad (18)$$

From Equation 18 it is seen that the quantity $(c_s - c_v)$ is related directly to the total mass in the tank and is independent of other factors such as the temperature of the fluid in the tank.

Figure 2:
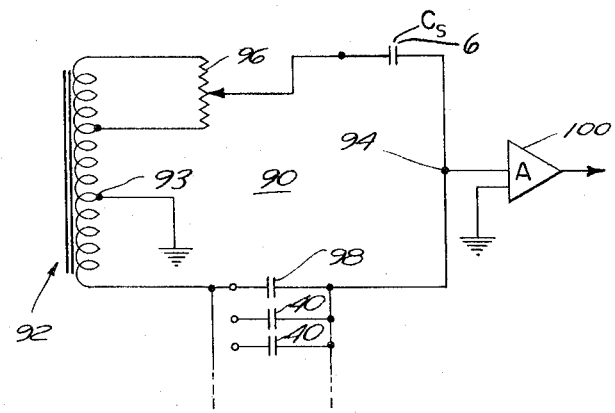

Measurement of $c_s - c_{sv}$ can be accomplished by the circuit of FIG. 2. Specifically, a bridge circuit 90, similar to the balancing network 36 of FIG. 1, is excited from the secondary of a transformer 92. Transformer 92 corresponds to the transformers 28 and 30 of FIG. 1, though in this case the primary is connected directly to an oscillator (not shown). The bridge 90 also includes the sensing capacitor 6 and a capacitor 98 in parallel with capacitors 40. The output of the bridge is taken between a grounded transformer tap 93 and a point 94 between the capacitor 6 and the capacitors 40. The capacitor 6 is connected to one end of the transformer 92 through a potentiometer 96.

The bridge output is applied to an amplifier 100 which corresponds to amplifier 46 of FIG. 1. A digital balancing system corresponding exactly to that of FIG. 1 is connected between the amplifier 100 and the capacitors 40, the latter being the same as their counterparts of FIG. 1. Accordingly, the output from amplifier 100 provides command signals for a counter 62 via a phase detector 48 and a steering gate 56. The counter in turn, effects the appropriate insertion of various combinations of capacitors 40 across capacitor 98 to balance the bridge 90 and thus, minimize the error signal at point 94. The digital balancing operation is thus identical with that of FIG. 1.

From Equation 18, it is seen that the capacitance $c_s$ of the capacitor 6 is related to mass by $$C_s = kk_1(M_l + M_g) + C_{sv} \qquad (19)$$

This, assuming equal voltages between the transformer taps 93 and the capacitors 6 and 98, the bridge 90 is balanced when $$kk_1(M_l + M_g) + C_{sv} = nC_0 + C_{98} \qquad (20)$$

Hence, if $C_{98}$ is made equal to $C_{sv}$, $$kk_1(M_l + M_g) = nC_0 \qquad (21)$$

and the mass $(M_l + M_g)$ is proportional to the content $n$ of the counter 62. Adjustment of the potentiometer 96 eliminates the factor, $kk_1/C_0$ and makes $n$ equal to the mass.

In FIG. 3, we have illustrated the preferred form of the switch 72a in the network 68. The switch functions to alternatively connect the capacitor 40a to a signal source 112 or to ground, depending upon the D.-C. control signal applied to a terminal 116. The source 112 corresponds to the transformer 28 of FIG. 1 or the transformer 92 of FIG. 2.

The switch 72a includes a pair of series-connected diodes 118 and 120, and a biasing network 122. The network 122 includes a D.-C. source 124 having a grounded negative terminal and a positive terminal connected to the cathode of diode 120 through a resistor 126. The cathode of diode 120 is connected to ground through a pair of diodes 128 and 130 and a Zener diode 132.

The D.-C. control signal applied to terminal 116 is derived from one of the lines 66 which, as seen in FIG. 1, are the parallel digital readout lines from counter 62. This signal is applied through a resistor 138 to the junction 140 of diodes 118 and 120. One electrode of the capacitor 40a is connected to the junction 140.

In considering the operation of the switch 72a of FIG. 3, assume that the source 124 has a sufficiently high potential to pass a substantial current through the diodes 128, 130 and 132. Also assume, for example, a voltage of 15 volts across the diode 132. Then if the control voltage at the terminal 116 is at a low positive value, e.g., less than one volt, diode 118 is rendered conductive by the biasing network 122 while diode 120 is cut off. As a result, a low impedance path if provided between the signal source 112 and the capacitor 40a.

On the other hand, while the voltage at terminal 116 has a large positive value, for example, in excess of seventeen volts, diode 118 is blocked while dodie 120 conducts, thereby providing a low impedance path to ground, as well as a high impedance between the source 112 and the capacitor 40a.

Diodes 128 and 130 in the biasing network 122 provide, in combination with source 124 and resistor 126, the bias for switching diodes 118 and 120. The Zener diode 132 functions to establish the control level at which switching occurs. Capacitors 134 and 136 provide low impedance A.-C. paths to ground. Thus, they enhance the attenuating effect of the switch when the diode 120 conducts. Further, the capacitor 136 and diode 132 provide the ground connections for the transformers 28 (FIG. 1) and 92 (FIG. 2).

The other switches in the switch network 68 are preferably of the same construction as the switch 72a.

Depending upon the pulse repetition rate of the clock 64 (FIG. 1), there is an interval between clock pulses during which the liquid level reading is stored in the counter 62. Although some of this time is needed to permit the switching transients to decay, much of the interval may be unused by the system. Therefore, during this inactive period the sensing capacitor 6 (FIGS. 1 and 2) can be switched elsewhere for other measurements or for the purpose of effecting a control function.

An important example of the advantage which can be taken of this opportunity for time sharing is in the instrumentation and control of rocket propulsion units.

A necessary control function in rocket propulsion units is the adjustment and control of the relative mass flow rates of the fuel and oxidizer to achieve maximum utilization of the propellant ingredients and minimum residual weight of the propellant when thrust is terminated due to exhaustion of the propellant. In liquid fuel rockets, the fuel is carried in one tank and the oxidizer in another, with the two constituents introduced in combination to the rocket motor. It has been found desirable to measure not only the masses of the oxidizer and the fuel contained in their respective tanks but also to determine the normalized mass difference between the fuel and oxidizer remaining in their respective tanks at any given time. The masses of the oxidizer and fuel are ideally measured by the digital capacitance system described in FIG. 2. However, rather than by subtracting the quantities measured by the respective digital capacitive systems, the relative mass may be determined directly by merely switching the fuel sensor and the oxidizer sensor simultaneously into a simple analog bridge circuit.

As seen in FIG. 4, an oscillator 144 is connected to jointly energize a fuel sensor 146 and an oxidizer sensor 148. The oscillator 144 corresponds to the oscillator 16 of FIG. 1 and the sensors 146 and 148 separately correspond to the sensing capacitor 6 of FIG. 2. The sensors are connected to time sharing switches shown at 150 and 151. A clock 152 controls the switches to alternately connect the fuel sensor between its mass-measuring bridge 154, where the measurement of the fuel mass is determined, and a relative mass bridge 156. In synchronism with the switching of the sensor 146, the switches 150 and 151 alternate the sensor 148 between its mass-measuring bridge 158 and the bridge 156. The bridges 154 and 156 are of the type shown in FIG. 2.

The output from the bridge 156, which is proportional to the relative mass difference between the residual oxidizer and the residual fuel, is fed to a servo valve control unit 160, which functions to adjust the relative flow rate of the oxidizer and the fuel to balance the bridge 156 and thus achieve optimum rocket performance.

Although the invention has been described in connection with the measurement of a dielectric fluid condition, it will be apparent that the system herein described may be used to monitor the condition of an electrically conductive fluid as well. Specifically, either the in-phase component of the bridge unbalance signal, the quadrature component, or the resultant of both components may be used. In the embodiments disclosed herein, the phase detector 48 rejects the quadrature component and thus the in-phase component (and 180° out-of-phase) is used.

FIG. 5 shows the preferred construction of the various capacitors, such as the capacitors 6 and 8, using the monitored fluid as a dielectric medium. The capacitor is preferably cylindrical, with inner and outer electrodes 164 and 166. The electrode 166 is perforated, as shown at 168, to provide access of the monitored fluid to the inter-electrode space. The spacing between the electrodes is maintained by dielectric spokes 170 with metallic bands 172 disposed around the middle portions of the spokes as shown. The bands 172 are grounded by means of wires 174, and connections to the electrodes are made by means of coaxial cables 176 and 178 whose outer conductors are also grounded.

With this arrangement the capacitances of the cables 176 and 178, as well as leakage across these cables, have negligible effect on the operation of the bridge circuits of FIGS. 1 and 2. These shunt paths are across the excitation transformers and output loads of the bridge circuits and thus they do not affect the balance condition. In this connection, it is noted that the impedances of the shunt paths are substantially greater than the impedances shunted by them.

The bands 172 function in the same manner. Leakage across the dielectric spokes 170, e.g., due to contamination, follows shunt paths in parallel with the excitation transformers and loads and thus such leakage has negligible effect on the measurement being made. Without the bands 172 and their connections to a common terminal in the manner described, leakage along the spokes 170 would amount to a shunting of the capacitor, thereby altering the reading indicated by the system.

Figure 6A:
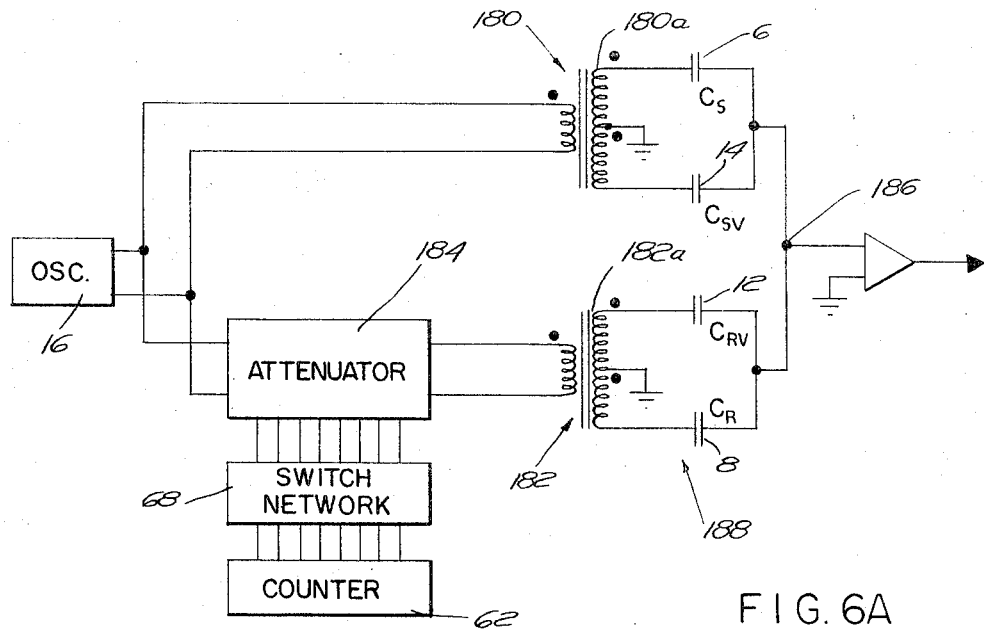

FIG. 6A illustrates another level measuring system operating in accordance with the same principles as the system of FIG. 1. The oscillator 16 is connected to the primaries of a pair of transformers 180 and 182, the connection to the transformer 182 being by way of a variable attenuator 184. The secondaries 180a and 182a have grounded center taps, with the ends of these windings connected to the capacitors, 6, 14, 8 and 12 as shown. The other electrodes of the capacitors are connected together at a junction 186.

The unbalance signal of the resulting bridge circuit appears between the junction 186 and ground, and this signal is amplified by the amplifier 46. The output of the amplifier is utilized, as in FIG. 1, to control the operation of counter 62. The counter and the switch network 68, in turn, control the attenuator 184 to reduce the unbalance signal to zero.

With further reference to FIG. 6A, when the bridge 188 is in balance, i.e., the unbalance signal has been cancelled, the various parameters are related by $$\frac{C_s - C_{sv}}{C_r - C_{rv}} = \frac{K_4}{P} \qquad (22)$$

where $K_4$ is the ratio of the turns ratios of transformers 180 and 182, and P is the attenuation imparted by the attenuater 184.

Relating (22) to (4), $$\frac{h}{H} = \frac{K_5}{P} \qquad (23)$$

where $K_5$ is a constant.

Figure 6B:
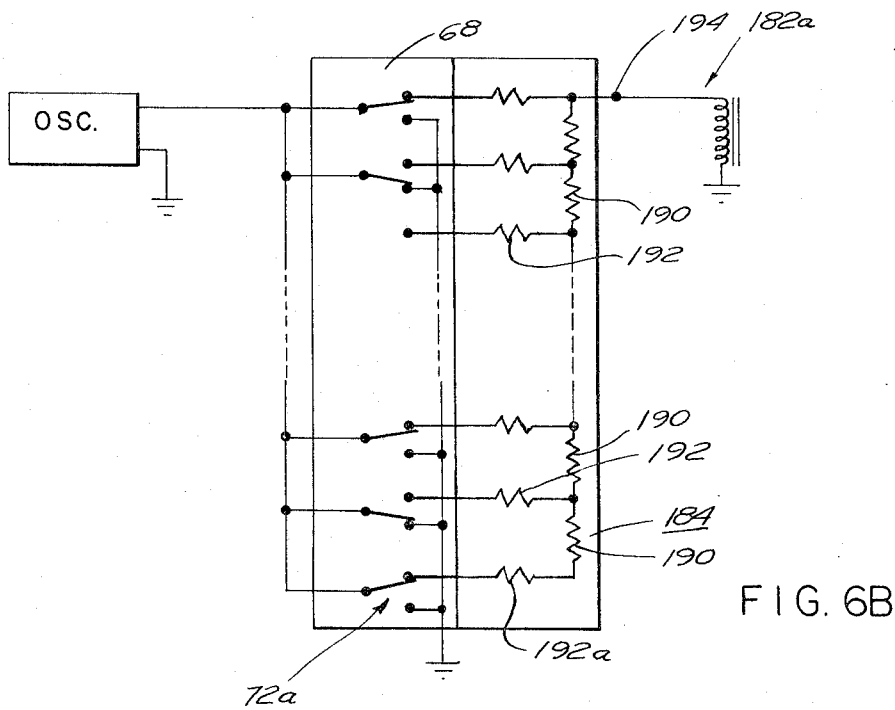

Turning to FIG. 6B, the attenuator 184 is seen to be a ladder network comprising series resistors 192. The shunt resistors are connected either to the oscillator 16 or to ground by the switches 72. Thus, the switch network 68 and attenuator 184 function as a well-known type of digital-to-analog converter. Binary inputs are in the form of the positions of the switches 72 and the analog output is the voltage at the terminal 194. The least significant digit is the position of the lowermost switch 72a, inasmuch as this contributes least to the voltage at the terminal 194. The contributions of the succeeding switches 72 in i.e., ascending order, are related by a factor of 2.

The switches 72, which may be of the type illustrated in FIG. 3, are energized by the counter 62, with the switch 72a positioned in accordance with the least significant digit in the content of the counter, and so on. Accordingly, the attenuation by the attenuator 184 is inversely proportional to the content $n$ of the counter 62. Relating this to Equation 23, $$h/H = K_6 n \qquad (24)$$

where $K_6$ is a constant.

It will be apparent that different numerical sequences than the one described above may be used. For example, instead of beginning with the least significant digit and progressing upwardly therefrom, one may use a logic system which begins with the most significant digit. Thus, in more general terms, the system makes use of a digital register which controls the switches 72 (FIG. 1), with the contents of the register being altered in a logical sequence until the balance condition of the bridge circuit is obtained, i.e., the unbalance signal is cancelled. This register may be part of an up-down counter such as the counter 62 or it may be part of any other unit which functions to minimize an error signal.

It will also be apparent that while a binary system is ordinarily the most convenient to use, other digital systems may be substituted in accordance with the invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

We claim:
1. Apparatus responsive to the quantity of a fluid, said apparatus comprising
   (a) a sensor having an electrical impedance which varies in accordance with said fluid quantity,
   (b) a bridge circuit having said sensor connected in one arm thereof and operable to develop an unbalance signal indicative of said quantity,
   (c) impedance balancing means connected to cancel said unbalance signal,
   (d) a reversible counter connected to control the impedance of said balancing means in accordance with the content of said counter,
   (e) a clock signal source connected for counting of the cycles thereof by said counter,
   (f) said counter being connected to count up when said unbalance signal has one sense and count down when said signal has the opposite sense,
   (g) whereby the variation of said balancing means in accordance with the content of said counter tends as a whole to minimize said unbalance signal.
2. The combination defined in claim 1 which further includes
   (a) an oscillator for exciting said bridge, and
   (b) a phase detector interposed between said bridge and said counter for comparing the phase of said unbalance signal with the phase of said oscillator, thereby to determine the direction of unbalance of said bridge.
3. The combination defined in claim 1 in which said impedance balancing means includes
   (a) a plurality of impedance elements whose impedances are ordered in accordance with the powers of the respective places in the content of said counter, whereby each of said elements corresponds to one of said places, and
   (b) a plurality of switches, each of which corresponds to one of said places in the content of said counter, each of said switches being arranged to connect the impedance element corresponding to the same place to cancel at least a portion of said unbalance signal when the content of said counter includes a given digit in said place.
4. The combination defined in claim 3 in which
   (a) said counter is a binary counter
   (b) said digit is a 1, and
   (c) the impedances of said impedance elements are related to the smallest impedance thereof by ascend-ascend powers of 2.
5. The combination defined in claim 1 in which said sensor is a capacitor having said fluid for at least a portion of its dielectric, the proportion of said dielectric comprising said fluid being a function of said quantity of said fluid.
6. The combination defined in claim 5 in which said bridge includes
   (a) first and second series-connected excitation sources having a first common terminal, said capacitor and a further impedance element being in series with each other and having a second common terminal,
   (b) means connecting said capacitor and further impedance element in parallel with said excitation sources,
   (c) two conductors connecting the electrodes of said capacitor to other elements of said bridge, and
   (d) electrostatic shields around said conductors connected to one of said common terminals.
7. The combination defined in claim 6 including
   (a) dielectric spacers maintaining the relative positions of the electrodes of said capacitor,
   (b) electrically conductive bands between said electrodes and on said spacers, and
   (c) means connecting said bands to said common terminals to which said shields are connected.
8. Apparatus for measuring the mass of a fluid, said apparatus comprising
   (a) a first capacitor having said fluid for at least a portion of its dielectric, the proportion of said dielectric consisting of said fluid being a function of said mass,
   (b) a bridge circuit comprising
       (1) first, second, third and fourth arms, said first capacitor being in one of said arms,
       (2) a second capacitor in a second arm adjacent to said first arm,

(c) impedance means connected to cancel the unbalanced signal developed by said bridge,
(d) a reversible counter connected to control the impedance of said impedance means in accordance with the content of said counter,
(e) a clock signal source connected for counting of the cycles thereof by said counter,
(f) said counter being connected to count up when said unbalance signal has one sense and count down when said signal has the opposite sense,
(g) whereby the variation of said impedance means in accordance with the content of said counter tends as a whole to minimize a component of said unbalance signal.

9. The combination defined in claim 8 in which said second capacitor has a capacitance substantially equal to the capacitance of said first capacitor when said first capacitor has a vacuum delectric.

10. The combination defined in claim 8 in which said impedance means includes
(a) a plurality of impedance elements, each of which corresponds to a place in the content of said counter, the impedances of the respective elements being related by the same factor which relates the values of the respective places in the content of said counter,
(b) means for connecting said elements to cancel at least a portion of said unbalance signal when the places to which they correspond contain a given digit.

11. The combination defined in claim 10 in which
(a) said impedance elements are capacitors,
(b) said counter is a binary counter,
(c) the impedance element having the smallest capacitance corresponds to the least significant digit in the content of said counter,
(d) the impedances of the respective elements are related by powers of two, and
(e) said elements which are connected by said switching means are connected in parallel to each other.

12. The combination defined in claim 8 in which
(a) said third and fourth arms of said bridge circuit are excitation sources having a first common terminal,
(b) said first and second arms have a second common terminal, and
(c) said bridge circuit includes
   (1) conductors connecting the electrodes of said first capacitor to the other portions of said bridge, and
   (2) electrostatic shields around said conductors and connected to one of said common terminals.

13. Apparatus responsive to the level of a fluid, said apparatus comprising
(a) a reference capacitor having said fluid as substantially entirely its dielectric,
(b) a sensing capacitor having said fluid as at least a portion of its dielectric, the proportion of said dielectric of said sensing capacitor consisting of said fluid being related to the level of said fluid,
(c) a bridge circuit connected to provide an unbalance signal which varies as a function of the ratio of the capacitances of said reference and sensing capacitors,
(d) variable impedance means connected to cancel said unbalance signal,
(e) a clock,
(f) a counter connected to count cycles of the output signal of said clock,
(g) said variable impedance means comprising a plurality of impedance elements,
   (1) each of said impedance elements corresponding to a place in the content of said counter,
   (2) the relative impedances of said elements being in accord with the powers of the places to which they correspond,
(h) switching means arranged to connect said elements so as to cancel at least a portion of said unbalanced signals when the places in said counter content corresponding to said elements contain a given digit,
(i) said counter counting up when said unbalance signal has one sense and counting down when unbalance signal has the opposite sense,
(j) thereby to connect said impedance elements in a series of steps tending as a whole to cancel said unbalance signal.

14. The combination defined in claim 13
(a) in which said bridge circuit includes third and fourth capacitors,
(b) said third capacitor having a capacitance equal to the capacitance of said sensing capacitor with a vacuum dielectric,
(c) said fourth capacitor having a capacitance equal to the capacitance of said reference capacitor with a vacuum dielectric,
(d) said bridge being connected to provide a first voltage corresponding to the difference between the capacitances of said sensing capacitor and said first capacitor and a second voltage corresponding to the difference between the capacitances of said reference capacitor and said fourth capacitor.

15. The combination defined in claim 14 including
(a) bridge balancing means comprising a second impedance element connected in series with said impedance elements connected by said switch means, with a first common terminal between said second impedance element and said connected impedance elements,
(b) means for applying the series combination of said first and second voltages across the series combination of said second and said connected impedance elements,
(c) a second common terminal between said voltages, said unbalance signal being the signal appearing between said first and second common terminals.

16. The combination defined in claim 15 in which said impedance elements are capacitors, said connected impedance elements being in parallel with each other.

17. The combination defined in claim 14 in which
(a) said bridge circuit includes first, second, third and fourth bridge arms,
(b) said first and second voltages appear across said first and second arms,
(c) first and second reference signals appear across said third and fourth arms,
(d) said unbalance signal corresponds to the difference between the ratios of said first and second voltages and said first and second reference signals, and
(e) said variable impedance means is connected to vary the ratio of said first and second reference signals.

18. The combination defined in claim 17 in which
(a) said third and fourth arms are the secondaries of transformers having primary windings, and
(b) said variable impedance means attenuates the signal applied to one of said primary windings.

19. Apparatus responsive to the quantity of a fluid, said apparatus comprising
(a) a sensor having an electrical impedance which varies in accordance with said fluid quantity,
(b) a bridge circuit having said sensor connected in one arm thereof and operable to develop an unbalance signal indicative of said quantity,
(c) impedance balancing means connected to cancel said unbalance signal,
(d) a digital register connected to control the impedance of said balancing means in accordance with the content of said register means,
(e) means for varying the content of said register in such manner as to bring it to a value providing an impedance of said impedance balancing means which minimizes said unbalance signal.

20. Apparatus for measuring the mass of a fluid, said apparatus comprising
  (a) a first capacitor having said fluid for at least a portion of its dielectric, the proportion of said dielectric consisting of said fluid being a function of said mass,
  (b) a bridge circuit comprising
    (1) first, second, third and fourth arms, said first capacitor being in one of said arms,
    (2) a second capacitor in a second arm adjacent to said first arm,
  (c) impedance means connected to cancel the unbalance signal developed by said bridge,
  (d) a digital register connected to control the impedance of said impedance means in accordance with the content of said register,
  (e) means for varying the content of said register in such manner as to bring it to a value providing an impedance of said impedance balancing means which minimizes said unbalance signal.

21. Apparatus responsive to the level of a fluid, said apparatus comprising
  (a) a reference capacitor having said fluid as substantially entirely its dielectric,
  (b) a sensing capacitor having said fluid as at least a portion of it dielectric, the proportion of said dielectric of said sensing capacitor consisting of said fluid being related to the level of said fluid,
  (c) a bridge circuit connected to provide an unbalance signal which varies as a function of the ratio of the capacitances of said reference and sensing capacitors,
  (d) variable impedance means connected to cancel said unbalance signal,
  (e) a digital register connected to control impedance of said impedance means in accordance with the content of said register,
  (f) said variable impedance means comprising a plurality of impedance elements,
    (1) each of said impedance elements corresponding to a place in the content of said register,
    (2) the relative of impedances of said elements being in accord with the powers of the places to which they correspond,
  (g) switching means arranged to connect said elements so as to cancel at least a portion of said unbalanced signals when the places in said register content corresponding to said elements contain a given digit,
  (h) means for varying the content of said register in a logical sequence bringing the impedance of said variable impedance means to a value minimizing said balance signal.

22. The combination defined in claim 1 in which
  (a) said impedance balancing means includes
    (1) a variable attenuator whose attenuation is controlled by said counter, and
    (2) a signal source supplying a signal to said attenuator whereby the output of said attenuator is a balancing signal tending to minimize said unbalance signal.

23. Apparatus responsive to the quantity of a fluid, said apparatus comprising
  (a) an excitation source providing an excitation signal,
  (b) a sensing capacitor whose capacitance varies in accordance with said fluid quantity,
  (c) a reference capacitor,
  (d) a bridge circuit incorporating said sensing capacitor and said reference capacitor and applying said excitation signal to said capacitors, thereby to develop an unbalance signal indicative of said quantity,
  (e) a variable attenuator connected to vary the current in the bridge arm containing one of said capacitors,
  (f) a reversible counter connected to control the impedance of said attenuator in accordance with the content of said counter,
  (g) a clock source connected for counting of the cycles thereof by said counter,
  (h) said counter being connected to count up when said unbalance signal has one sense and count down when said signal has the opposite sense, and
  (i) whereby the variation of the attenuation of said attenuator in accordance with the content of said counter tends as a whole to minimize said unbalance signal.

24. Apparatus responsive to the quantity of a fluid, said apparatus comprising
  (a) first and second transformers, each of which has
    (1) a primary winding, and
    (2) a tapped secondary winding having first and second ends,
  (b) a first bridge section comprising
    (1) said first transformer,
    (2) a sensing capacitor having a capacitance which varies in accordance with said fluid quanitiy,
    (3) a second capacitor having a capacitance corresponding to the capacitance of said sensing capacitor with a vacuum dielectric, and
    (4) means connecting said capacitors in series across said secondary of said first transformer,
  (c) a second bridge section comprising
    (1) said second transformer,
    (2) a reference capacitor having said fluid as its dielectric,
    (3) a fourth capacitor having a capacitance corresponding to the capacitance of said second capacitor with a vacuum dielectric, and
    (4) means connecting said reference capacitor and said fourth capacitor in series across said secondary of said transformer,
  (d) means forming a common junction of the junctions between
    (1) said sensing and second capacitors, and
    (2) said reference and fourth capacitors,
  (e) means interconnecting said transformer taps,
  (f) an excitation signal source,
  (g) means applying the signal from said source to the primaries of said first and second transformers, thereby to provide a bridge circuit having an unbalance signal appearing between
    (1) said transformer taps, and
    (2) said common junction,
  (h) a variable attenuator connected to attenuate the signal applied to one of said primaries,
  (i) a digital register connected to control the attenuation of said attenuator in accordance with the content of said register, and
  (j) means for varying the content of said register in such manner as to bring it to a value providing an attenuation of said attenuator which minimizes said unbalance signal.

25. Apparatus for monitoring a fluid, said apparatus comprising
  (a) a first capacitor having said fluid for at least a portion of its dielectric,
  (b) a bridge circuit comprising
    (1) first, second, third and fourth arms, said first capacitor being in one of said arms,
    (2) a second capacitor in a second arm adjacent to said first arm,
  (c) impedance means connected to cancel the unbalance signal developed by said bridge,
  (d) a digital register connected to control the impedance of said impedance means in accordance with the contents of said register, and
  (e) means for varying the content of said register in such manner as to bring it to a value providing an impedance of said impedance balancing means which minimizes said unbalance signal.

(References on following page)

References Cited by the Examiner

UNITED STATES PATENTS

| | | | |
|---|---|---|---|
| 2,945,165 | 7/1960 | Franzel | 73—304 X |
| 2,962,641 | 11/1960 | Maltby et al. | 324—99 X |
| 3,010,320 | 11/1961 | Sollecitu | 73—304 |
| 3,189,891 | 6/1965 | Karsh | 324—99 X |

OTHER REFERENCES

Stout, M. B., Basic Electrical Measurement, Prentice-Hall, Inc., Engelwood Cliffs, N.J., 1960 (p. 331 relied on).

LOUIS R. PRINCE, *Primary Examiner.*

S. BAZERMAN, *Assistant Examiner.*

UNITED STATES PATENT OFFICE
CERTIFICATE OF CORRECTION

Patent No. 3,301,056                      January 31, 1967

Robert L. Blanchard et al.

It is hereby certified that error appears in the above numbered patent requiring correction and that the said Letters Patent should read as corrected below.

Column 4, line 52, the formula should appear as shown below instead of as in the patent:

$$\frac{h}{H} = \frac{(C_s - C_{sv})}{(C_r - C_{rv})} \frac{(C_{rv})}{(C_{sv})} (1+\alpha_g) - \alpha_g$$

Signed and sealed this 17th day of October 1967

(SEAL)
Attest:

EDWARD M. FLETCHER, JR.                     EDWARD J. BRENNER
Attesting Officer                             Commissioner of Patents